(12) United States Patent
Popovic et al.

(10) Patent No.: US 8,867,062 B2
(45) Date of Patent: Oct. 21, 2014

(54) SYSTEM, METHOD AND COMPUTER PROGRAM FOR ENABLING SIGNINGS AND DEDICATIONS ON A REMOTE BASIS

(75) Inventors: Milos Popovic, Mississauga (CA); John H. D. Wiltshire, Toronto (CA); Matthew Mann Gibson, Toronto (CA); Robert James Darling, Toronto (CA); Margaret Atwood, Toronto (CA)

(73) Assignee: Syngrafii Inc., Toronto, Ontario (CA)

( * ) Notice: Subject to any disclaimer, the term of this patent is extended or adjusted under 35 U.S.C. 154(b) by 2090 days.

(21) Appl. No.: 11/720,249

(22) PCT Filed: Nov. 25, 2005

(86) PCT No.: PCT/CA2005/001788
§ 371 (c)(1),
(2), (4) Date: Nov. 18, 2009

(87) PCT Pub. No.: WO2006/056063
PCT Pub. Date: Jun. 1, 2006

(65) Prior Publication Data
US 2010/0284033 A1    Nov. 11, 2010

(30) Foreign Application Priority Data

Nov. 25, 2004  (CA) .................................... 2488491
Nov. 21, 2005  (CA) .................................... 2527458

(51) Int. Cl.
*G06F 3/12* (2006.01)
*B43L 13/00* (2006.01)
*G06F 3/13* (2006.01)

(52) U.S. Cl.
CPC .. *B43L 13/00* (2013.01); *G06F 3/13* (2013.01)
USPC ....... 358/1.15; 358/1.18; 358/1.9; 178/18.01; 178/19.05; 345/181; 235/379

(58) Field of Classification Search
CPC combination set(s) only.
See application file for complete search history.

(56) References Cited

U.S. PATENT DOCUMENTS

| 3,925,610 | A | 12/1975 | French et al. |
|---|---|---|---|
| 4,176,455 | A | 12/1979 | Copeland et al. |
| 4,703,511 | A | 10/1987 | Conoval |
| 4,794,403 | A | 12/1988 | Sieber et al. |
| 4,817,034 | A * | 3/1989 | Hardin et al. ................. 345/173 |
| 5,222,138 | A | 6/1993 | Balabon et al. |
| 5,652,806 | A * | 7/1997 | Friend .......................... 382/175 |
| 5,835,081 | A | 11/1998 | Oka |
| 5,917,470 | A | 6/1999 | Fujioka |
| 6,307,955 | B1 | 10/2001 | Zank et al. |
| 7,443,807 | B2 * | 10/2008 | Cutler .......................... 370/254 |
| 7,525,928 | B2 * | 4/2009 | Cutler .......................... 370/254 |
| 2001/0030756 | A1 * | 10/2001 | Ohmori ......................... 358/1.3 |
| 2002/0013815 | A1 * | 1/2002 | Obradovich et al. ......... 709/204 |
| 2002/0051262 | A1 * | 5/2002 | Nuttall et al. ................. 358/537 |
| 2003/0231238 | A1 | 12/2003 | Chew et al. |
| 2003/0231330 | A1 * | 12/2003 | Westervelt et al. .......... 358/1.13 |
| 2004/0001225 | A1 * | 1/2004 | Takahashi .................... 358/1.15 |
| 2004/0107252 | A1 * | 6/2004 | Futa et al. .................... 709/204 |
| 2005/0018687 | A1 * | 1/2005 | Cutler ........................ 370/395.2 |

FOREIGN PATENT DOCUMENTS

WO    9931466 A2    6/1999

OTHER PUBLICATIONS

Australian Government IP Australia, Examiner's First Report dated Jul. 25, 2013, issued on Australian Patent Application No. 2012201002.
Canadian Intellectual Property Office, Office Action dated Jul. 30, 2012, issued on Canadian Patent Application No. 2488491.
Norton Rose Canada LLP, Office Action Response dated Jan. 30, 2013, filed on Canadian Patent Application No. 2488491.
Canadian Intellectual Property Office, Office Action dated Feb. 14, 2013, issued on Canadian Patent Application No. 2527458.
Norton Rose Fulbright Canada LLP, Office Action Response dated Aug. 14, 2013, filed on Canadian Patent Application No. 2527458.
Japan Patent Office, Certificate of Patent dated Apr. 28, 2011, issued on Japanese Patent No. 4733141.
Korean Intellectual Property Office, Certificate of Patent dated Dec. 11, 2012, issued on Korean Patent No. 10-1212965.

Patent Cooperation Treaty, International Search Report dated Apr. 3, 2006, issued on PCT Application No. PCT/CA2005/001788.
European Patent Office, Supplementary European Search Report dated Jun. 24, 2009, issued on European Patent Application No. 05815039.2.
European Patent Office, Examination Report dated Dec. 28, 2011, issued on European Patent Application No. 05815039.2.
Kilburn & Strode LLP, Response to Examination Report dated Jul. 9, 2012, filed on European Patent Application No. 05815039.2.

* cited by examiner

*Primary Examiner* — Hilina K Demeter
(74) *Attorney, Agent, or Firm* — Norton Rose Fulbright Canada LLP

(57) ABSTRACT

A system, method and computer program for enabling signings/dedications on a remote basis is provided. A first computer at a first location is associated with an individual from whom a signature or dedication is required. A second computer at a location where the signing or dedication is required is linked to the first computer so as to provide a two-way audiovisual communication system. The second computer is operate e to receive input from one or more individuals regarding their request for a signature and/or dedication, and to communicate the request to the first computer. The first computer is operable to permit the individual associated with the first computer to review the request, and based on such request provide a signature and/or personalized dedication as an input to an input device connected to the first computer. The first computer transmits the signature and/or personalized dedication from the first computer to the second computer. The second computer is >@5r0+5 to receiving the signature and/or personalized dedication, and provide the signature and/or personalized dedication to a plotting apparatus device connected to the second computer. The plotting apparatus device is >@5r0+5 to apply the signature and/or personalized dedication introduced to the plotting apparatus device to an article, substantially in the handwriting of the individual associated with the first computer, based on the operation of the plotting apparatus device. A computer program for enabling the functions described is also provided. A related method is also disclosed.

12 Claims, 12 Drawing Sheets

SYSTEM, METHOD AND COMPUTER PROGRAM FOR ENABLING SIGNINGS AND DEDICATIONS ON A REMOTE BASIS

FIELD OF THE INVENTION

This invention relates in general to technologies that enable one or more persons to interact remotely. This invention relates more particularly to technology that enables individuals having a fan base and their fans to interact for the purpose of signings and/or dedications, where such individuals and their fans are at different locations. This invention relates still more particularly to plotting technology that enables said signings and/or dedications.

BACKGROUND OF THE INVENTION

There are numerous situations in which an interactive signing or dedication between the signor and at least one other person is desired. Individuals with a following come to mind, such as popular artists, media personalities, actors, or athletes. The members of the following or "fans" of such individuals often seek signing/dedication of one or more of articles such as books, a CDs, or a T-shirts, depending on the area of endeavour of the person having the fan base.

The case of an author who has achieved a degree of popularity is representative of the demand for signings and dedications, and the implications of this demand on the author, on his/her fans, and also on the related industries having an interest in the signing/dedications taking place.

Book tours have become standard fare in the publishing industry. These book tours often include special events such as university readings, literary festivals and in-store "meet the author" events. In each case, it is very common to incorporate a book signing that permits fans of the author and/or the book to have one or more copies signed by the author, or in many cases provided with a personal dedication.

One purpose of the book signing is building relations between the author and fans, in order to create a loyal base of readers, which in turn helps to promote sales. The book signing also plays a valuable role in attracting media attention, which also encourages sales.

The proliferation of large scale bookstores in urban centers has also created an increased demand for book signings.

The publishing industry has also become more "global" in the sense that an increasing number of authors have developed an international fan base, which has resulted in demand for book signings in disparate locations throughout the globe. One of the aspects of this global publishing industry is the simultaneous release of new publications in several countries, coupled often with international book tours.

The above has contributed overall to authors being asked (if not required under their publishing contracts) to participate in fairly long book tours involving multiple book signings and travel to often far flung parts of the Earth. The costs of these book tours can be very significant. It is important to understand that the associated costs involve not only the travel expenses of the author, but also the significant person hours required to organize the infinite details of a well run book tour.

From the perspective of the publisher, while the fans generally demand these book tours, given the margins in the book business it is often challenging to recover the associated cost, which further reduces the applicable profit margins. Or alternatively, these costs contribute to the increased cost of books, which further erodes readership.

From the perspective of the author, book tours often involve several months spent away from home with the author generally living from a suitcase. This time spent by authors on the road often distracts from the writing, which is a disadvantage to the publisher as well. Fans eager for the signature/dedication most often are required to converge on a relatively small number of book signing locations, often in larger bookstores in urban centres. This regularly results in line ups, which makes the event rather time consuming for the fans and also for the author. It is fairly common to give the author an allotted time for the book signing that is often insufficient given the number of fans. The result is that some fans are turned away without their copy of the book being signed and/or dedicated, which is disappointing for the fans and frustrating for the author. Or alternatively, the book signing becomes a bit of an assembly line with pressure being placed on the author by handlers to speed up their per fan interaction.

A little known aspect of the book signing process from the author's perspective is the requirement to make available relatively large numbers of copies of books signed by the author. The signature of these books often takes place at the site of the bookstore where the author is often put in a small room away from view for this purpose. This time consuming activity matched often with a less than desirable setting is often inconvenient.

The above example of book signing and their context is representative of media events involving signings in other situations such as media events in support of CD launches, concert tours, promotional events in support of television or radio shows, move launches, film festivals and so on.

Video conferencing equipment is well known. There are a number of different technologies manufactured and distributed by various companies. One particular manufacturer of video conferencing equipment markets its equipment under the brand POLYCOM™. Also the proliferation of Voice Over IP (VoIP) is resulting in the deployment of a wide array of other video conferencing solutions over this communication protocol. This, in combination with the increased distribution of software with video conferencing capability, including for example WINDOWS™ which now includes video conferencing functionality, is compounding the availability of this technology, and the number of particular solutions available.

Plotting apparatuses are also well known. Plotting apparatuses are vector drawing devices that generally employ a pen device moveable by the plotting apparatus in X and Y axes, so as to reach any point on the surface of a target area that receives, for example, a piece of paper. The plotting apparatus also generally includes a mechanism for raising and lowering the pen device. Most plotting apparatuses were originally designed for generating engineering drawings. They generally break up elements to be plotted into a small series of line segments. Advances in raster printing technologies (e.g. bubble jets, lasers, etc.) have made pen plotting apparatuses less widespread.

There is a need therefore for a system, computer program and method that addresses the aforesaid disadvantages. In particular, there is a need for a system, computer program and method that enables individuals having a fan base to participate in signings/dedications on a remote basis. More particularly, there is need for a specialized tool for authors to participate in in-store book signing on a remote basis. Preferably, the system, computer program and method satisfies the demands of the fans as much as possible, while resulting in significant savings of time (publisher, author, and bookstore) and money (publisher, bookstore, sometimes author). There is also a need for a system, computer program and method that is operable to permit signings/dedications at a relatively low cost at multiple locations.

In addition, there is a need for an improved plotting technology for use in connection with the system and method of the present invention. Prior art plotting technology has a number of disadvantages. First, the operation of such devices is relatively slow, and therefore the time required to trace a human signature or dedication is relatively long, which results for example in relatively long wait times at book signing events. Second, the quality of reproduction of signature or dedication prepared by operation of the prior art plotting apparati is not optimal. In particular, prior art plotting apparati generally cannot mimic the variations in pen pressure typical of a human signature, which results in visual variances between the signature traced by the prior art plotting apparati and the original signature or dedication. Third, in many cases signatures/dedications traced by prior art plotting apparati have a slightly mechanical quality that needs improvement. Fourth, each signature especially is unique and therefore it is desirable to define an optimal tracing path and associated attributes for achieving a balance between speed and quality of reproduction. This optimal tracing path and associated attributes are preferably defined for each signature/dedication, as they will vary depending on the characteristics of the particular signature/dedication. Prior art plotting apparati are not operable to define such an optimal tracing path. Fifth, prior art plotting apparati do not work very well on non-flat surfaces, e.g. that of a book that is difficult to flatten completely and hold in place such as because of the book's spine.

There is a need therefore for an improved plotting apparatus for use in signing personalized dedications. There is a further need for a plotting apparatus that is operable to achieve a balance of speed and quality of reproduction. There is a further need for a plotting apparatus that is operable to trace a signature on non-flat surfaces.

SUMMARY OF THE INVENTION

A system, method and computer program for enabling signings/dedications on a remote basis is provided. In accordance with the invention, an individual having a fan base (such as an author, performance artist, athlete or media personality) is located at a first geographic location, and an article signing (book, CD, t-shirt, etc.) is located at a second geographic location remote from the first, the signing/dedication event being attended by one or more fans.

In one particular embodiment of the invention, a system, method and computer program for enabling book signings on a remote basis is provided. In accordance with the invention, an author is located at a first geographic location (or author's location), and a book signing is located at a second geographic location remote from the first (or book signing location), the book signing being attended by one or more individuals.

The system includes a two-way audiovisual communication system that enables interaction between the individual having a fan base and one or more fans via a network, by operation of computer devices located at each of the author's location (first computer) and each signing/dedication location (second computer).

The system also includes a plotting apparatus device connected to the second computer that is operable to mark one or more books with the author's signature and/or a personalized dedication (in one particular embodiment of the invention). The plotting apparatus device is connected to a communication facility and an input device. The input device is operable to receive input from the one or more individuals regarding their request for the author's signature and/or personalized dedication. The communication facility is operable to communicate this request to the first computer.

An input device is also connected to the first computer. The first computer is operable to permit the author to review the request, and based on such request provide the signature and/or personalized dedication as an input to the input device connected to the first computer. The signature and/or personalized dedication are sent from the first computer to the second computer, by operation of a communication facility connected to the first computer.

The second computer is operable to receive the signature and/or personalized dedication, and forward same to the plotting apparatus device. The plotting apparatus device is operable to receive the signature and/or personalized dedication and, based on such signature and/or personalized dedication, create a facsimile thereof, substantially in the handwriting of the author.

The method of the present invention comprises the steps of: (1) providing a first computer at a location of an individual having a fan base, and providing a second computer at a location where fans of the individual have gathered for a signing/dedication, the first computer and the second computer being linked so as to provide a two-way audiovisual communication system; (2) receiving at the second computer an input from one or more fans regarding their request for a signature and/or personalized dedication from the individual having the fan base; (3) communicating the request to the first computer; (4) the individual having the fan base reviewing the request, and based on such request providing a signature and/or personalized dedication as an input to an input device connected to the first computer; (5) transmitting the signature and/or personalized dedication from the first computer to the second computer; (6) receiving the signature and/or personalized dedication at the second computer, and providing the signature and/or personalized dedication to a plotting apparatus device connected to the second computer; and (7) applying signature and/or personalize dedication introduced to the plotting apparatus device, substantially in the handwriting of the individual having the fan base, based on the operation of the plotting apparatus device.

The computer program of the present invention, in one aspect thereof, is best understood as a computer application or computer applications that when loaded on the first computer and the second computer is operable to facilitate the interactive method described above.

In a more particular aspect of the present invention an improved plotting apparatus is provided for enabling the signings/personalized dedications in accordance with the present invention. The plotting apparatus enables a pattern to be traced with improved accuracy and speed. The plotting apparatus is operable to enable a pattern to be traced on a non-flat surface, such as inside a book, which because of its spine is not completely flat (or is cumbersome to flatten completely and hold in place), on an article of clothing or on any other three-dimensional surface.

In a particular embodiment of the present invention, the plotting apparatus provides a signing apparatus for enabling a human signature to be traced with improved accuracy and speed. In a still more particular embodiment, the signing apparatus is operable to approximate pressure variations associated with a particular human signature in tracing the human signature.

Accordingly, another aspect of the method of the present invention comprises the steps of: (a) providing a first computer at a first location associated with an individual from whom a signature or dedication is required, and providing a second computer at a location where the signing or dedication is required, the first computer and the second computer being linked so as to provide a two-way audiovisual communication system; (b) receiving at the second computer an input from one or more individuals regarding their request for a signature and/or dedication; (c) communicating the request to the first computer; the individual associated with the first computer reviewing the request, and based on such request providing a signature and/or personalized dedication as an input to an input device connected to the first computer; (d) transmitting the signature and/or personalized dedication from the first computer to the second computer; (e) receiving the signature and/or personalized dedication at the second computer, and analyzing the signature and/or personalized dedication and defining a plurality of commands defining an optimal tracing path and associated attributes, said plurality of commands being operable on the plotting apparatus to achieve a balance between speed of operation and quality of reproduction; and (f) providing the plurality of commands to a plotting apparatus connected to the second computer; and applying signature and/or personalized dedication introduced to the plotting apparatus, substantially in the handwriting of the individual associated with the first computer, by operation of the plotting apparatus based on the plurality of commands.

In a still more particular embodiment of the present invention, a particular structure for an improved plotting apparatus is provided, in one embodiment of the present invention. The present invention also provides an optimization utility for performing the analysis of the signature and/or personalized dedication and defining the plurality of commands for enabling the plotting apparatus to trace the signature and/or personalized dedication based on an optimal tracing path and associated attributes.

BRIEF DESCRIPTION OF THE DRAWINGS

A detailed description of the preferred embodiment(s) is(are) provided herein below by way of example only and with reference to the following drawings, in which.

Figure 1:
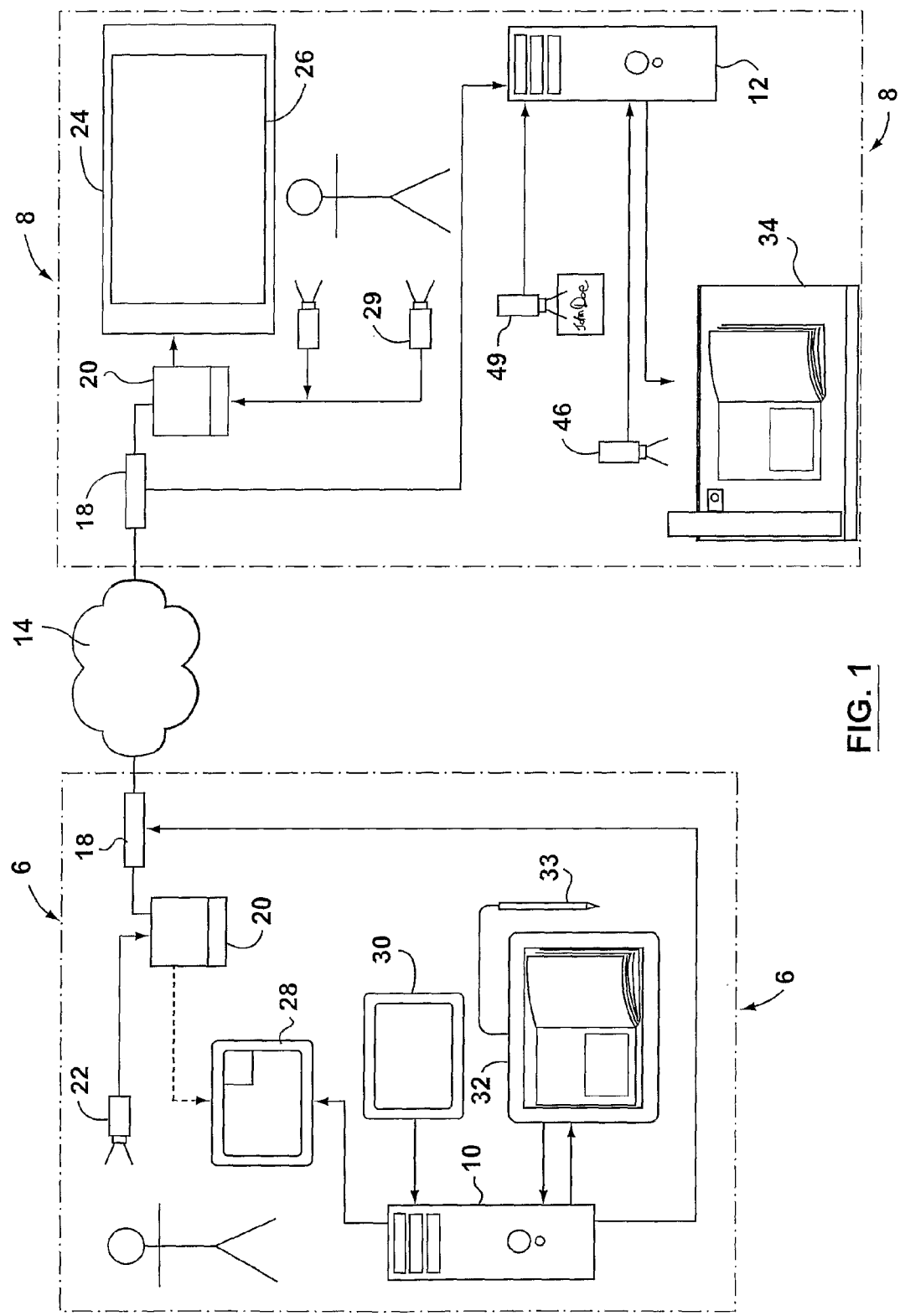
FIG. 1 is a system diagram that illustrates the overall resources of the system of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

In the present invention, for the sake of illustration of the advantages of the present invention, the invention is explained in the context of an "author" and his/her fans. It should be understood, however, that the case of the author is one example of a situation where interactive signings/dedications on a remote basis are desirable. Other such individuals, as explained above, include musicians, bands and other performance artists, actors, athletes, and media personalities. The word "author" can generally be substituted in the disclosure with any such other individuals having a fan base that participate in signings/dedications.

As shown in FIG. 1, the system of the present invention is best understood as consisting of at least a first or author side system (6) and a second or remote system (8) connected to the author side system (6), as illustrated in FIG. 1. The author side system (6) includes a first computer (10) and the remote system (8) includes a second computer (12). The author side system (6) is located at a first geographic location, namely the author's location. This author side system (6), in accordance with a specific aspect of the invention, is often located at the home of the author (for reasons explained below). The remote system (8) is located at the geographic location of a signing or dedication event, such as a book signing, which in most applications is at a bookstore. The author side system (6) and the second remote system (8) are connected by means of a network connection (14) such as a satellite network or DSL Internet connection.

It should be understood that the present invention contemplates a plurality of remote systems (8) at different locations, each remote system (8) being configured to connect to the author side system (6) for the purpose of a remote book signing in accordance with the method described. Also, in another particular embodiment, the author side system (6) consists of a plurality of different author side systems (6) installed at different locations, thereby permitting the author to engage in remote book signings in accordance with this invention from a plurality of locations.

The first computer (10) and the second computer (12) generally consist of standard standalone computers including standard hardware, software and middleware usually required to operate a personal computer. In order to minimize system crashes that could cause interruption of remote book signings due to hardware or software errors unrelated to the hardware or software directly linked to the functions described herein, the first computer (10) and the second computer (12) are, in a particular embodiment of the invention, special purpose computers dedicated to the functions of the described invention. Another advantage of the use of special purpose computers, is that it simplifies the operation of the present invention in that all that is required is to turn on the computer, and the computer applications described below can load and begin operating automatically.

The first computer (10) includes a plurality of standard drivers (not shown) required for the interoperation of the first computer (10) with the peripherals specified below. The first computer (10) includes a communication interface that enables the first computer to interface with the network (14), usually via a router (18).

The system also preferably includes a standard video transceiver box (20) such as POLYCOM's VSX7400IP or VSX3000QBRL. The video transceiver box (20) is operable to connect to the network (14), also by operation of the router (18). Also connected to the video transceiver box is an author side camera (22). The camera (22) is operable to interoperate with the video conferencing equipment described below, and the camera (22) is best understood as part of the video conferencing system (24) that is in turn part of the system of the present invention, as described in greater detail below. The camera (22) is operable to take a series of images of the author at the author's location and transmit such images via the video transceiver box (20), the router (18) and the network (14) to the remote system (8), and via the router (18) and transceiver box (20) linked to the remote system (8) to the video conferencing system (24). The video conferencing system (24) preferably includes a big screen or projector (26). The video conferencing system (24) interoperates with the camera (22) to deliver high quality images of the author to the big screen or projector (26).

A monitor (28) is preferably linked to the camera (22) such that the author can view the image of himself/herself and of her surroundings that will be made available or is being made available on the big screen or projector (26). This enables the author to make sure that, for example, the view of the author's location meets the author's requirements.

A fan area (not shown) is preferably defined. The next fan in line at the book signing moves to the fan area. This fan area can be defined by a mat, a cordoned area or the like. The fan area is preferably within range of a fan camera (29) that is operable to take images of the fan who is next in line and transmit this image to a web cam monitor (30) that is connected to the first computer (10) and which is operable to display to the author the series of images. It should be understood that the functions of monitor (28) and webcam monitor (30) can be provided in one monitor, divided into corresponding views or screens. In one particular embodiment, the fan camera (29) consists of a known, relatively low cost web camera, which provides the author with adequate image quality to interact with the fan, while providing cost savings over, for example, the use of video conferencing equipment similar to the video conferencing equipment used at the remote location. The author is also provided with an audio feed. The audio feed is usually integrated with the video conferencing system (24). In one particular embodiment of the invention, it provides a simultaneous audio feed in both directions analogous to a telephone connection but at a higher quality level. The audio data is multiplexed with video data and transmitted in this format to provide audio/video synchronization. It should be understood, however, that the present invention also contemplates other implementations such as one wherein the author is provided with videoconferencing equipment also, the invention thereby including two-way video conferencing equipment configure to enable relatively high quality two-way audio and video, in a manner that is known.

Also connected to the first computer (10) (or part of the first computer (10)) is a known tablet computer or tablet device (32). In one particular embodiment, the tablet (32) consists of a known tablet computer with interactive pen display functionality, such as a CINTIQ™ brand table computer marketed by Wacom Technology Corporation (such as a CINTIQ model 15x with a 15" VGA colour LCD display and a pressure sensitive pen/table overlay), including the CINTIQ™ interactive pen display. These tablets are operable to receive input from a pen/eraser (33) of special application such that a user can write/draw on the surface of the tablet (32), and the tablet (32) displays a digital rendering of such writing/drawings, in a manner that is known.

Figure 2:
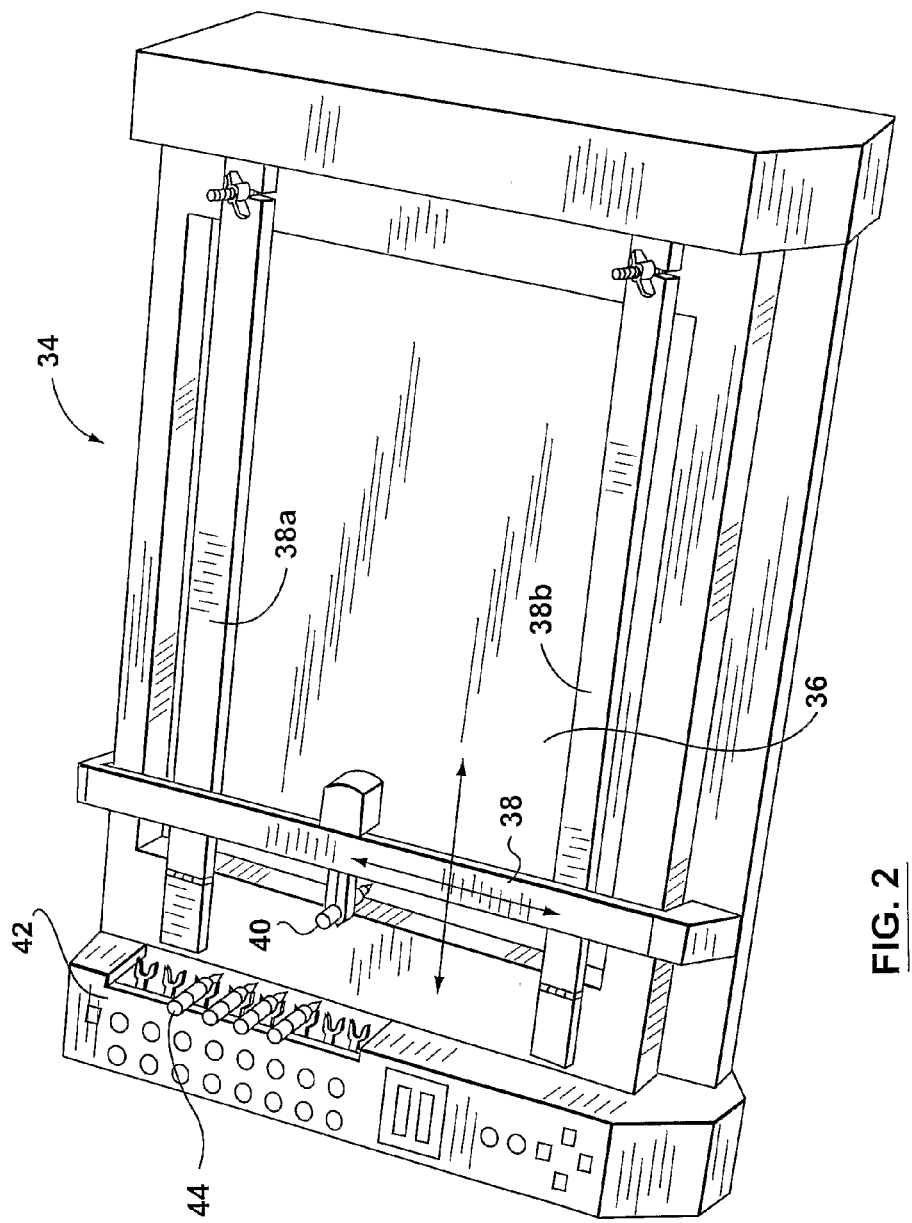
FIG. 2 is a perspective view of a representative plotting apparatus for use in accordance with the present invention, in a first embodiment thereof.
Figure 3:
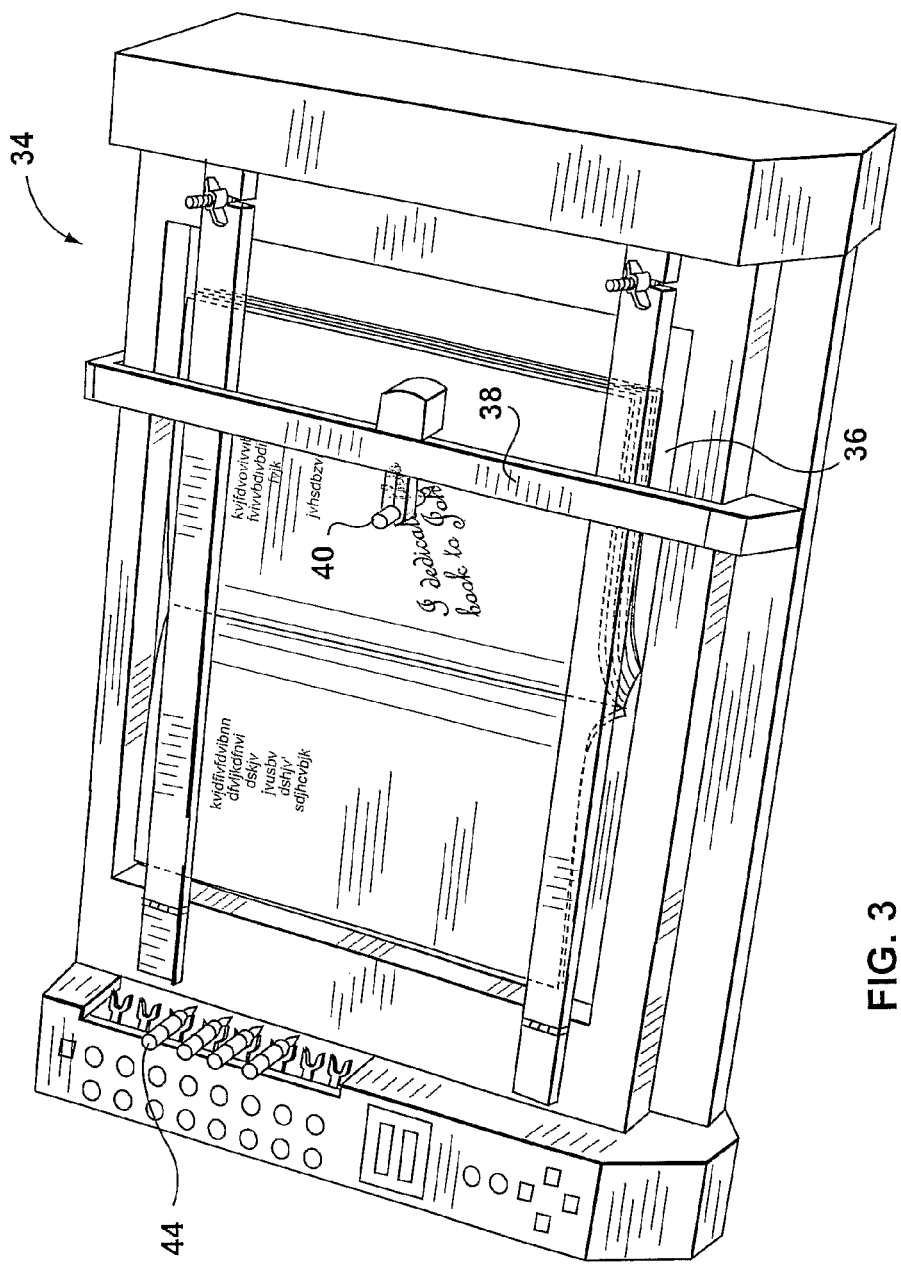
FIG. 3 is a further perspective view of a representative plotting apparatus, signing/dedicating a book.

Connected to the second computer (12) is a plotting apparatus (34). The plotting apparatus (34) in a first embodiment of the present invention is a known plotting apparatus such as those manufactured by GRAPHTEC™, HP™ or ROLAND™. As best know in FIG. 2, in a first preferred embodiment of the present invention the plotting apparatus (34) consists of a target area or plotting apparatus bed (36) that is operable to receive a paper article such as a book, as shown in FIG. 3. In one particular embodiment, the plotting apparatus (34) is operable to comply with irregularities in the height of the surface introduced in the plotting apparatus (34) thereby accommodating different thicknesses of books from thin paperbacks to textbooks. It should be understood, that the signature/dedication is generally applied to the first few pages, and if this is done on the right hand side of a standard book with the spine on the left-hand side, generally all that is required is that the plotting apparatus (34) be able to accommodate the varying thicknesses of different books. The plotting apparatus (34) also includes a plotting arm (38) that is connected to a pen (40). In the particular embodiment of the plotting arm (38) shown in FIGS. 2 and 3, the plotting arm 38, which is generally vertically situated is coupled to a pair of horizontally situated arms (38a) and (38b) for movement of plotting arm (38) along the length of such horizontal arms (38a) and (38b). The plotting arm (38) is operable to move (1) the pen (40) in the X and Y axes within the target area (36), and (2) move the pen so as to lower it to bring it into contact with the target area (36) or raise the pen (40) so as to bring it out of contact with the target area (36).

The pen (40) is generally a felt tipped pen. One particular type of plotting apparatus (34) includes a carousel (42) that includes a plurality of cartridges (44). The plotting arm (38) and the pen (40) are operable to: (1) remove a cartridge (44) from the carousel (42) and load the cartridge (44) from the carousel (42) into the pen (40), and (2) repeat (1) so as to replace the cartridge (44) loaded in the pen (40) with another cartridge (44) from the carousel (42). The cartridges (44) are generally of different colours, or consist of refill cartridges when a cartridge (44) that is in use runs out of ink.

As shown in FIG. 1, a plotting apparatus camera (46) is connected to, or in the proximity of, the plotting apparatus (34). The plotting apparatus camera (46) is also connected to the second computer (12). The second computer (12) also includes a plurality of standard drivers (not shown) required for the interoperation of the second computer (12) with the peripherals described herein. The second computer (12) also includes a communication interface that enables the second computer (12) to interface with the network (14), usually via the router (18).

The function of the plotting apparatus camera (46) is to take an image of the target area (36). This image is stored to the hard drive (not shown) of the second computer (12). A buffer application (48) (illustrated in FIGS. 4 and 5) that is part of the computer program of the present invention, is loaded on the second computer (12) and keeps track of the most recent image taken of the target area (36).

A client application (50) loaded on the first computer (10) is operable to link to the second computer (12) via the network connection (14). The client application (50) and the buffer application (48) are programmed in a manner that is known such that the two are able to communicate with one another.

The present invention includes means for calibrating the tablet (32) to the plotting apparatus surface (36). In one particular aspect of the present invention, this is accomplished by operation of the plotting apparatus camera (46), which provides the eye to the pen/eraser (33). In one particular embodiment of the present invention, the client application (50) is operable to request the buffer application (48) for the most recent image from the plotting apparatus camera (46). This image of the target area (36) is then displayed on the screen of the tablet (32). By operation of the tablet (32), the pen/eraser (33) can be used to superimpose writing/drawing onto the image of target area (36) by operation of the known tablet (32). In this particular implementation of the present invention, the author uses the pen/eraser (33) to select the corners of the image of the target area (36) so as to define the area of the tablet (32) screen that will provide the input area on that screen. Calibration in accordance with this method is generally only required at the beginning of a session. This solves the problem of alignment of the target area (36) and of the tablet (32) screen in that the author will use the image of the target area (36) as his/her reference for determining the size of the writing and orientation of the writing (e.g. straight line or not).

In one particular implementation of the present invention, the client application (50) obtains said images from the second computer (12) by connecting to the second computer by ftp:// and downloading and displaying the most recent image of the target area (36).

Figure 10A:
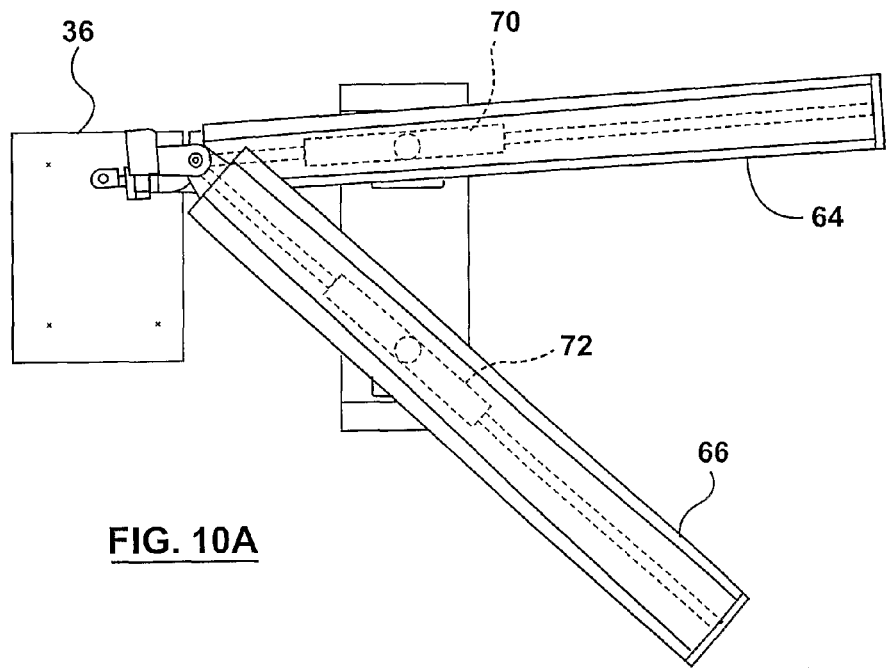
FIGS. 10*a*, 10*b*, and 10*c* are top views of the plotting apparatus of the present invention, illustrating the tracing of a signature by the plotting apparatus at three selected points thereof.
Figure 10B:
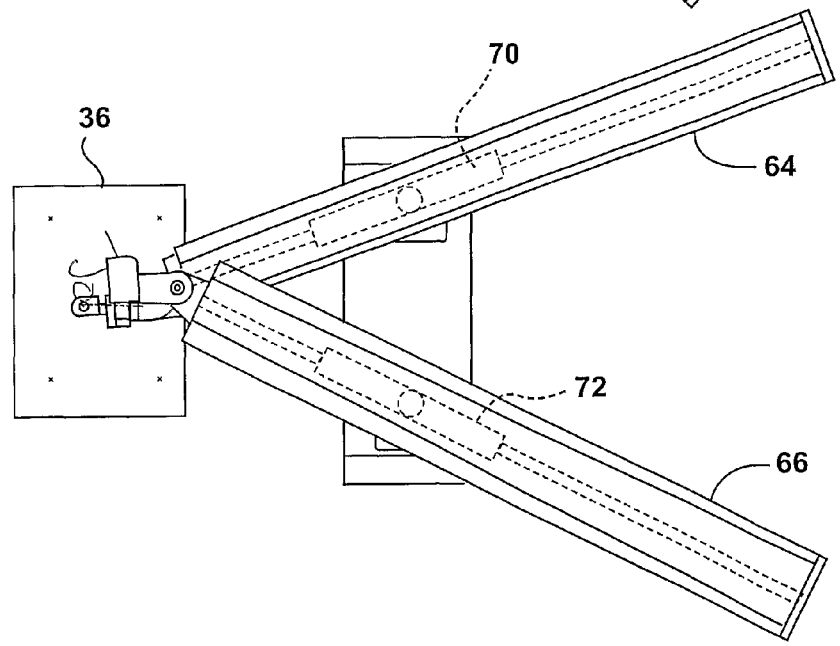
Figure 10C:
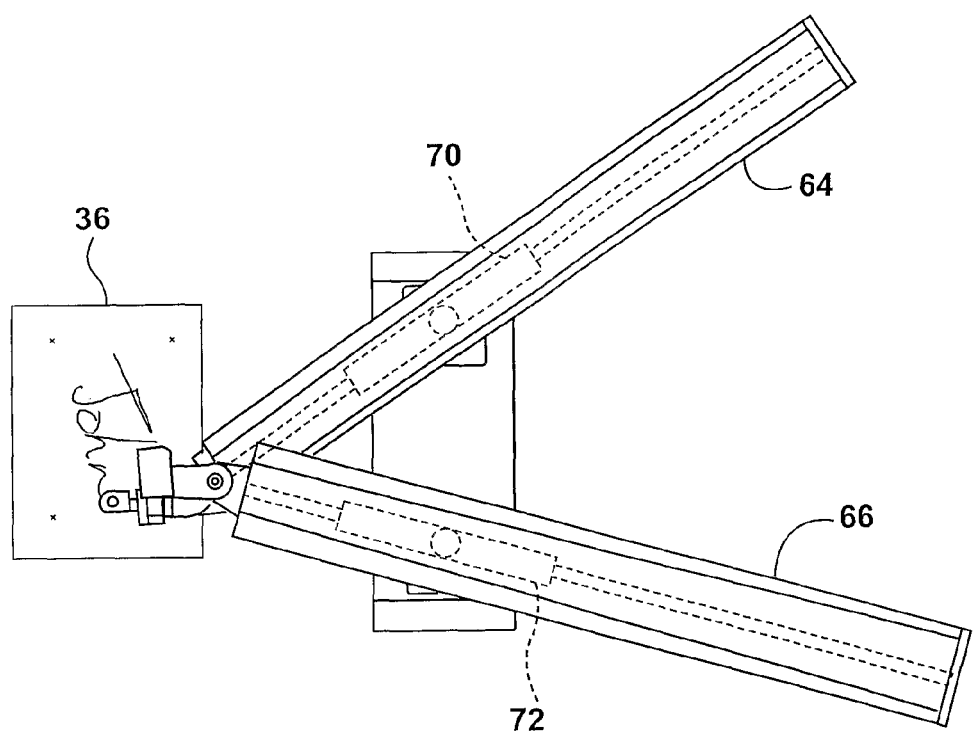
Figure 11:
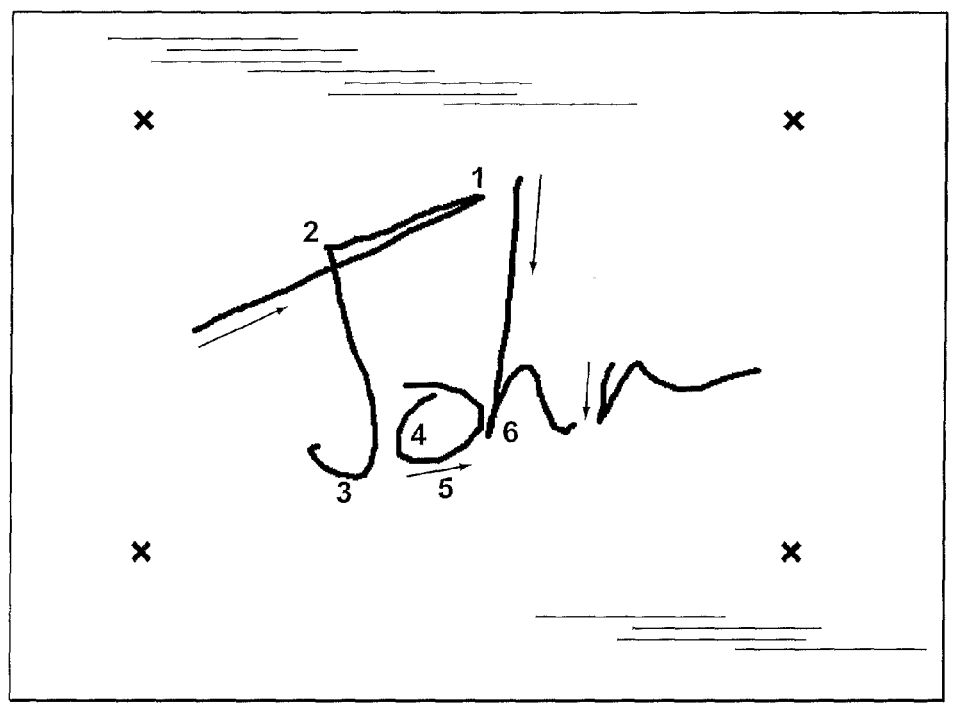
FIG. 11 is a diagram illustrating the paths used to trace particular handwritten characters, based on the output of the optimization utility of the present invention.

The client application (50) (illustrated in FIGS. 4 and 5) defines on the first computer (10) a menu that preferably includes "NEW", "SEND", "CALIBRATE" and "EXIT" buttons, or their equivalents. "NEW" enables the author to create a new signature/dedication by operation of the present invention. "CALIBRATE" initiates the calibration method described above. Once the author has created a signature/dedication that meets the author's requirements as well those of the fan(s) (as communicated via the video and audio sources described above), the author engages the "SEND" button, in response to which the client application (50) assembles a file comprising the signature/dedication command (referred to as a "scribble file") and sends this scribble file to the second computer (12), which is stored to its hard drive. The buffer application (48) is operable to scan the hard drive to search for and retrieve the most recent scribble file and transmit this information to the plotting apparatus (34). The plotting apparatus (34) is operable to receive this data and interpret such data as a path of points with specific X and Y coordinates in the target area (36). Based on such information, the plotting apparatus (34) is operable to trace a facsimile of the signature/dedication onto the book by operation of the pen (40), as best shown in FIG. 3, and also pen (68) of the second embodiment of the plotting apparatus (34) illustrated in FIGS. 10a, 10b, and 10c.

Another aspect of the invention is that the system is operable to generate a plurality of pre-signed copies of books. An image consisting of a signature/dedication is transmitted to the second computer (12) as described above. Thereafter, a plurality of books is signed as explained above with the same signature/dedication. Alternatively, the second computer (12) also includes a known randomizer (not shown) that is operable to make small random adjustments to the signature/dedication, thereby giving the impression that each signature/dedication is personalized, as each is different.

Because of variations in the size, positioning and rotation of the book, as well as in the positioning of the plotting apparatus camera (46), the bit mapped image received from the plotting apparatus camera (46) is generally adjusted by the client application (50) before display of the image on the tablet (32) screen. This is achieved by application of offsetting (X,Y), scaling (gx, gy) and rotation (theta) to the image, in a manner that is known. This is provided by means of an adjustment routine that is provided to the programming of the client application (50), in a manner known to a skilled programmer. The result of the application of the adjustment routine is that the image, once adjusted, is presented on the tablet (32) screen such that it corresponds with the actual plotting coordinates. In an alternate embodiment of the present invention, a generalized transform could be applied to compensate for spherical aberration, parallax etc.

Means is also provided for the fan to communicate its request for the signing and especially dedication. The request can be communicated verbally by the fan via the described audio or optionally a further camera (49) is directed to a pad of paper or tablet (32) that enables the fan to write some or all of its request, e.g. the spelling of names to be included in the dedication. The camera (49) is operable to make images of such writings of the fan, which are communicated to the first computer (10) as specified above.

It should be understood that modifications can be made to the plotting apparatus (46) to permit writing on surfaces made of materials other than paper, for example, fabric (t-shirts for example). The plotting apparatus technology used in the present invention can also be modified (by using robotics common in the field of automated painting, for example) to allow writing on three-dimensional objects (such as baseball caps, for example). Such modifications would be obvious to a person skilled in the art.

Figure 4:
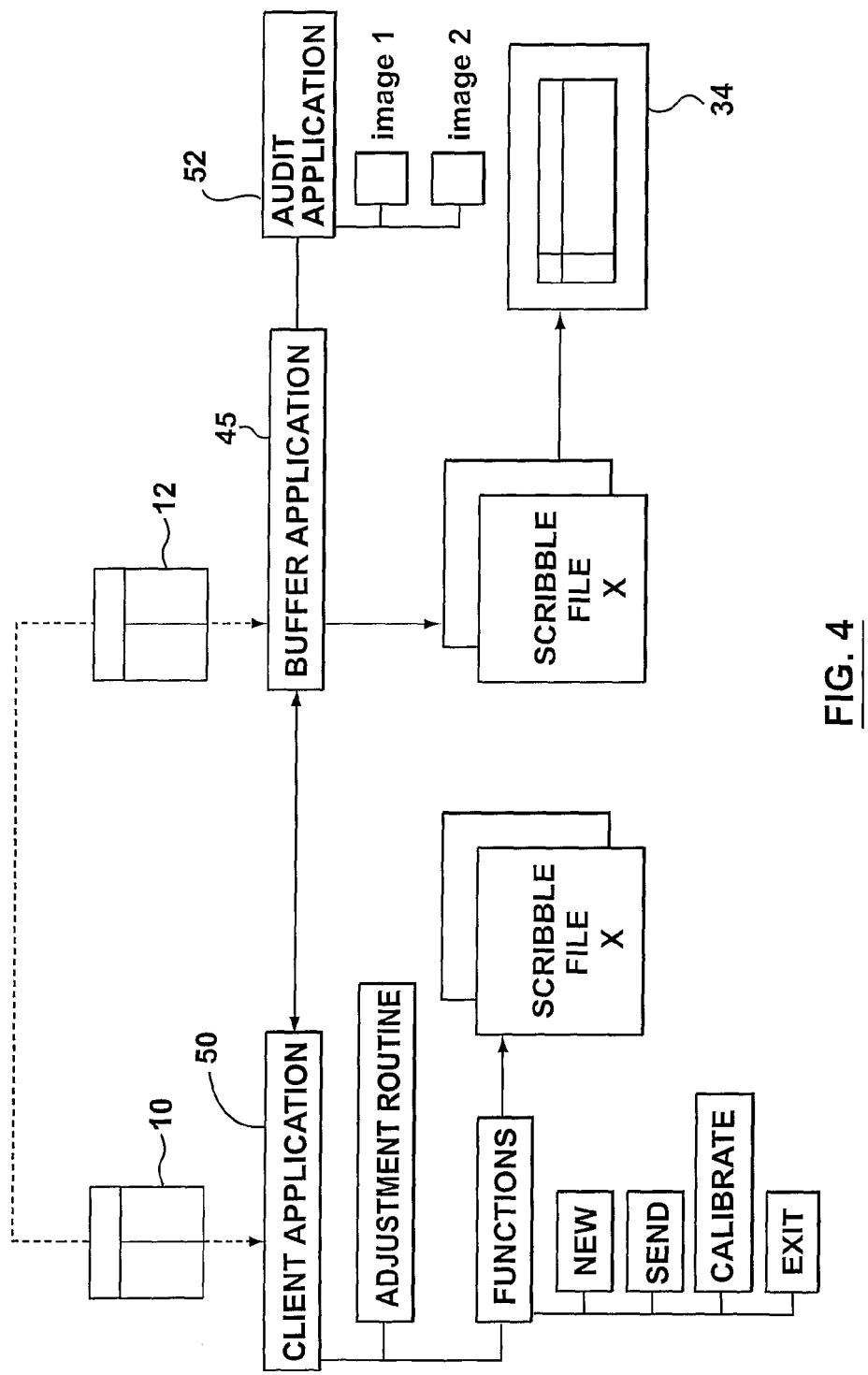
FIG. 4 is a program resource diagram that illustrates the resources of the computer program of the present invention.

In another aspect of the present invention the computer program residing on the second computer (12) includes an audit application (52) (as shown in FIG. 4) which is operable to take an image of each dedication/signature made by the plotting apparatus (34) and store such images (preferably as read only files) to the hard drive (not shown) of the second computer (12). This provides a record against attempts to have authors sign unauthorized articles, such as a cheque for example. The audit application (52) also includes means for counting signatures/dedications made and preparing reports based on such information, in a manner that is known. This counting data and lot reports can be compiled from the various remote locations.

It should also be understood that the present invention can also be used to indicate acceptance of the document because a record can be created of a signing party's consent via video conference, and a signed document can be created remotely that bears the consenting party's signature. In this particular embodiment, the various devices described would be available at the two or more locations where the signing occurs. Also, the physical manifestation of the acceptance on the document, i.e. the signature using the plotting apparatus, could be combined with electronic evidence of acceptance, by means of a PKI digital signature that is applied to an electronic version of the signed document, in a manner that is known.

The method of the present invention comprises the steps of:
1. providing a first computer at a location of an author, and providing a second computer at a location of a book signing, the first computer and the second computer being linked so as to provide a two-way audiovisual communication system; 2. receiving at the second computer an input from one or more individuals regarding their request for a signature and/or personalized dedication from the author; 3. communicating the request to the first computer; 4. the author reviewing the request, and based on such request providing a signature and/or personalized dedication as an input to an input device connected to the first computer; 5. transmitting the signature and/or personalized dedication from the first computer to the second computer; 6. receiving the signature and/or personalized dedication at the second computer, and providing the signature and/or personalized dedication to a plotting apparatus device connected to the second computer; and 7. applying signature and/or personalize dedication introduced to the plotting apparatus device, substantially in the handwriting of the author, based on the operation of the plotting apparatus device.

Plotting Apparatus

In another preferred embodiment of the present invention, an improved plotting apparatus is provided. The plotting apparatus enables a pattern to be traced with improved accuracy and speed. The plotting apparatus is operable to enable a pattern to be traced on a non-flat surface, such as inside a book, which because of its spine is not completely flat (or is cumbersome to flatten completely and hold in place), on an article of clothing or on any other three-dimensional surface.

In a particular embodiment of the present invention, the plotting apparatus provides a signing apparatus for enabling a human signature to be traced with improved accuracy and speed. In a still more particular embodiment, the signing apparatus is operable to approximate pressure variations associated with a particular human signature in tracing the human signature.

Figure 6:
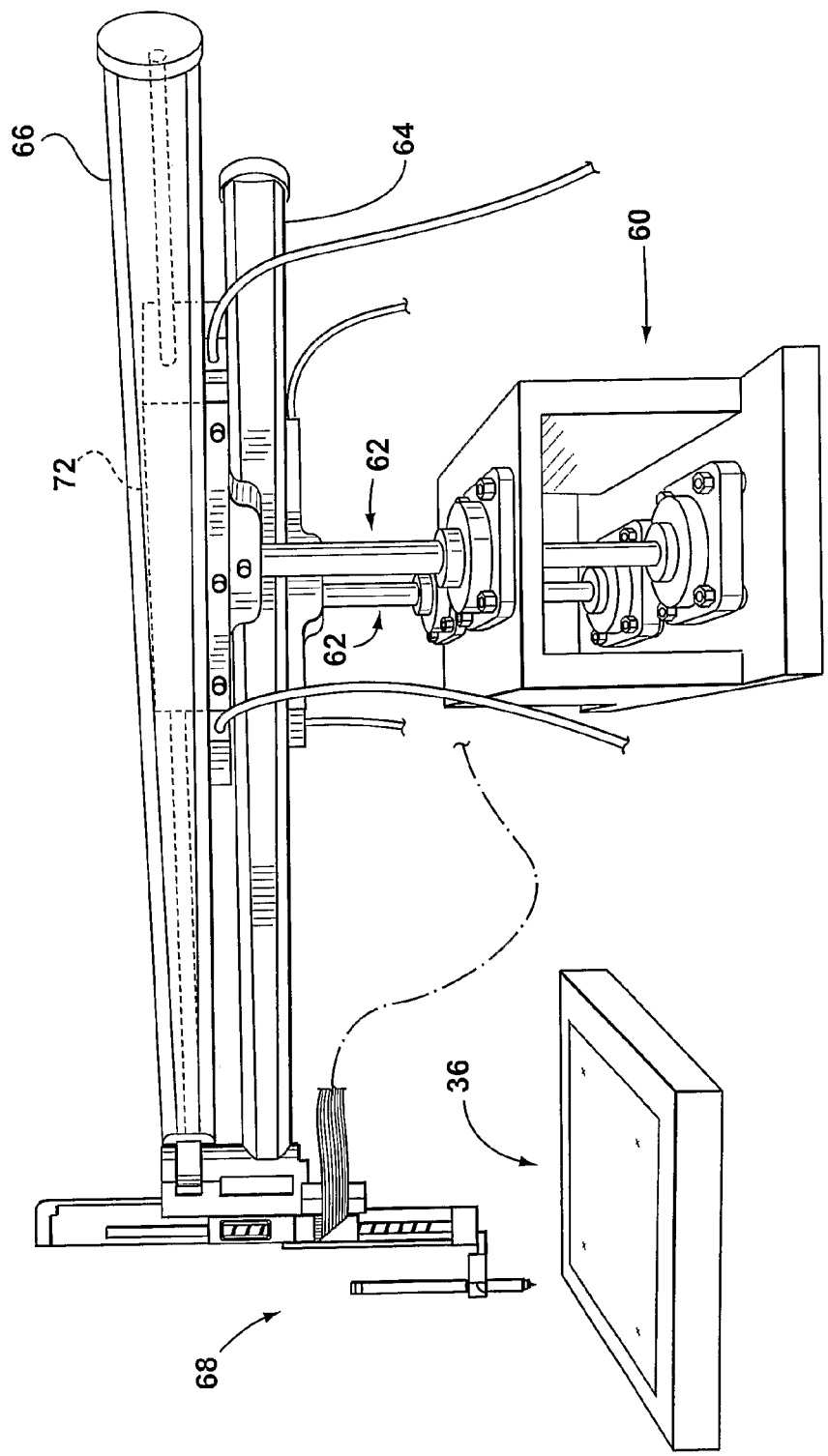
FIG. 6 is a side perspective view of the plotting apparatus of the present invention, in a second embodiment thereof.

As best illustrated in FIG. 6, the improved plotting apparatus includes: (1) a base or block (60) that includes two base pivots (62) spaced apart from one another, (2) a first and a second arm (64) (66), each arm being linked to one of the two base pivots (62) at a first end thereof, and connected to one another at an arm pivot point at a second end opposite to the first end, and (3) a marking means or pen (68) disposed adjacent to the second end.

Figure 7:
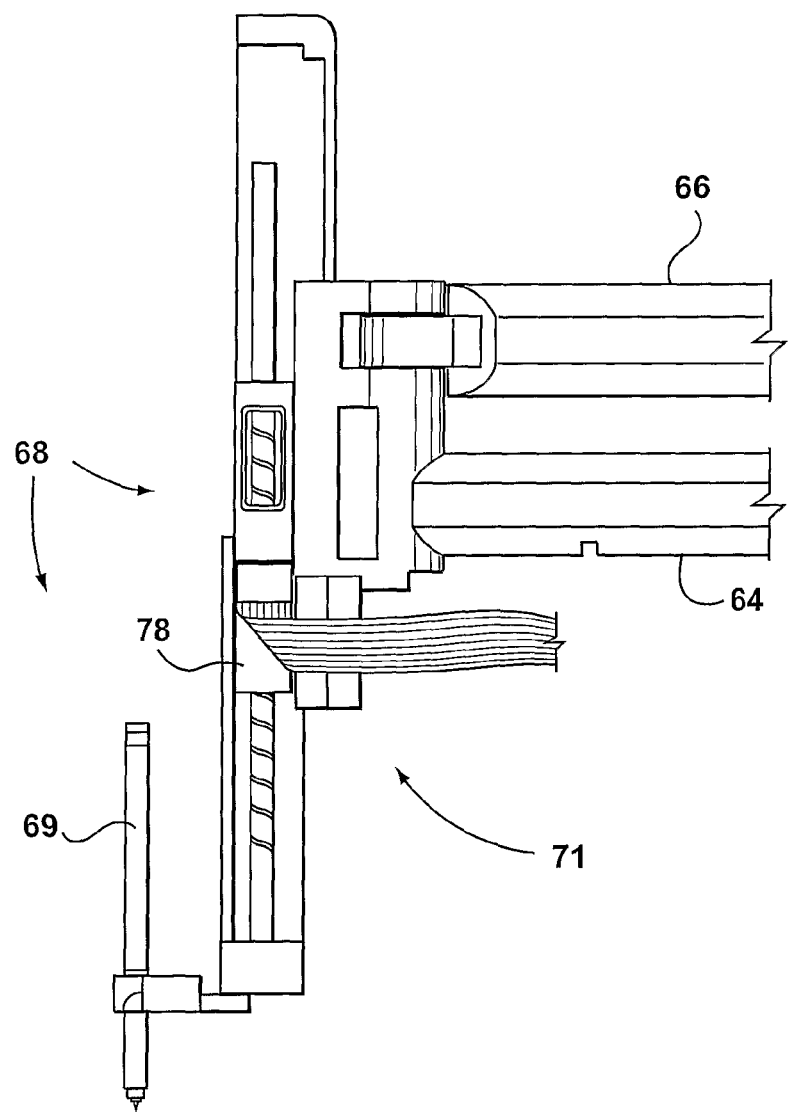
FIG. 7 is a partial view of the plotting apparatus of the present invention, in a representative embodiment thereof, said view illustrating the pen of the plotting apparatus.

As illustrated in FIG. 7, pen (68) is best understood as a pen assembly including a pen device (69) and also a support assembly (71) connected to the first and second arms (64) (66).

Each of the first and second arms (64) (66) is linked to a first and a second linear electric motor particularized below (70) (72) (best shown by the dotted lines in the top views of FIGS. 10a, 10b, and 10c below), which motor enables extension of each arm respectively. A controller (74) is coupled to the first and second linear electric motors, which controller (74) is operable in combination with the first and second linear electric motors (70) (72) to selectively actuate each of the first and second arms (64) (66) to dynamically determine the triangulation achieved by the first and second arms (64) (66) in combination, and thereby direct the pen (68) to a particular point in X/Y coordinates defined for the target area (36) (as particularized below). It should be understood that the first and second arms (64) (66) having the structure particularized herein are capable of: (a) tangential motion, i.e. when the first and second arms (64) (66) are mostly pivoting, and (b) radial motion when the first and second arms (64) (66) arms are mostly extending or contracting. For a given stroke length the mechanics of the device will make tangential motions much faster than radial motions if the rods (as per the "stator/slider" mechanism described below) are moved at the same rate. The movement of the first and second arms (68) is best understood by reference to FIGS. 10a, 10b, and 10c.

The first and second arms (64) (66) are elevated over the target area (36) or tracing a pattern on an object, such as a book but also other items such as t-shirts, basketballs and the like. The selective determination of triangulation of the first and second arms (64) (66) enables the plotting apparatus to align with particular points of the target area (36).

As shown in FIG. 4, a third linear electric motor (78) is linked to the pen (68), and is operable to drive the pen device (69) to achieve upward and downward movements, and also pressure variations as particularized below. The pen device (69) can be an ordinary felt pen.

The first and second linear electric motors (70) (72), in accordance with a particular embodiment of the present invention, are disposed within the body of the first and second arms (64) (66), as best shown in FIGS. 7a, 7b, 7c and 7d. In a particular implementation of the present invention, the first and second arms (64) (66) include "stator/slider" components connected to the base pivot points (62) and to the first and second linear electric motors (70) (72), which first and second linear electric motors (70) (72) are further connected to the body of the first and second arms (64) (66) respectively. Accordingly, by controlling the extension of the first and second linear electric motors (70) (72), the first and second arms (64) (66) are operable to extend by a similar distance, thereby enabling the first and second linear electric motors (70) (72) to drive the first and second arms (64) (66).

Figure 5:
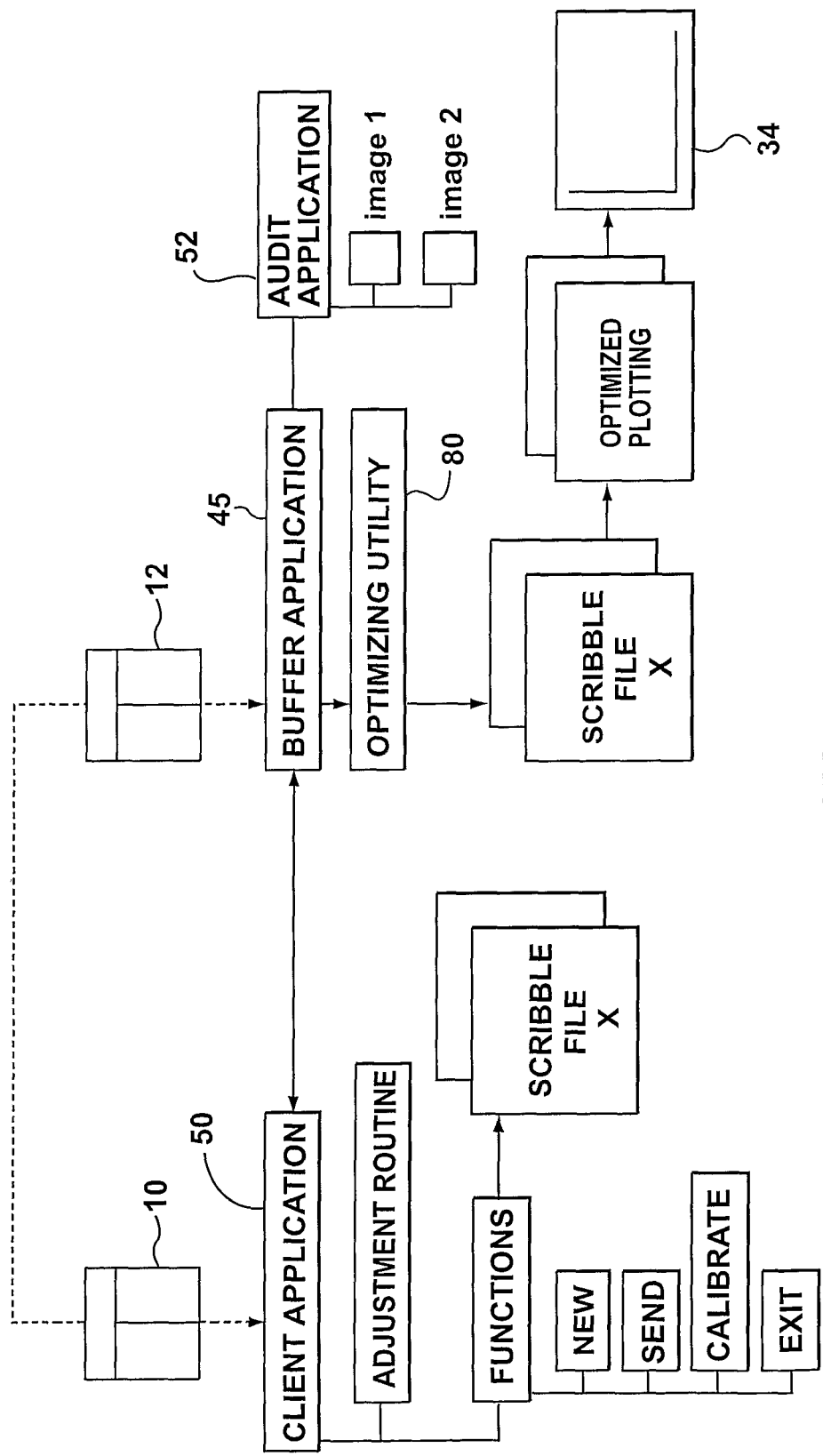
FIG. 5 is another program resource diagram that illustrates the resources of the computer program of the present invention, including the optimization utility of the present invention.

FIG. 5 is a representative illustration of a circuit board that provides the controller (74) of the present invention. Various configurations of various components are possible. A personal computer interface (71) is provided; connections to the low lever controllers (73) and position encoder feedback (75). The interoperable electric components are cabled in a manner that is known.

Linear electric motors manufactured by LINMOT™ are suitable to provide the linear electric motors described in the present invention. But other electric motors capable of providing the driving of the moving components of the present invention are also contemplated.

FIG. 6 offers a further perspective view of the plotting apparatus (34) with the plotting apparatus (34) in operation thereof.

The linear electric motors are operable to be controlled in two modes: 1.) a controlled displacement mode, and 2.) a controlled force mode. The extension of the first and second arms (64) (66) occurs in the controlled displacement mode. The controller (74) is operable to enable the pen (68) to trace patterns on non-flat surfaces by controlling the third linear electric motor (78) to operate in the controlled force mode so as to be constrained by a force value and to extend to a varying distance that is below the target area (36). This aspect of the control of the plotting apparatus automatically addresses the problems posed by tracing a pattern on non-flat surfaces, and also enables approximation of the pressure variations, as further particularized below.

Because the pen (68) cannot achieve its programmed distance/displacement without exceeding the programmed force limit, the pen device (69) presses on the inscription surface in the target area (36) with a programmed force value established by the controller (74). Accordingly, the pen (68) is compliant with irregular surfaces as it will continue to exert the programmed force, regardless of the height of the surface. As well, the plotting apparatus (34) is operable to dynamically change the programmed force limit to mimic the force recorded on the tablet (32). Thus, variations in line width & intensity can be recreated on the inscription surface.

One of the challenges in operating the described plotting apparatus (34) is achieving maximum speed and minimum oscillation. Speed is desirable so that the waiting time required for completion of the tracing of the signature/dedication is minimal. Oscillation is undesirable because it results in discrepancies between the signature/dedication and the version traced by operation of the plotting apparatus. A more particular aspect of the present invention is the method and system by which the movements of the plotting apparatus are controlled to optimize speed and oscillation. It should be understood that particularly at points of a signature/dedication where there is a change in direction (e.g. curve changes to linear movement in a different direction) mechanical vibration dependent upon the speed can be very significant. The present invention optimizes for this effect and other similar effects.

In a particular aspect of the present invention, a digital version of a signature/dedication is captured, for example as described in the Co-Pending Patent Application, i.e. signature/dedication data is collected from the author.

In accordance with a particular aspect of the present invention, the data collected from the author is processed to limit oscillations while maximizing speed. In a particular embodiment of the present invention, this optimization is made by an optimization utility (80). The speed, acceleration and jerk (rate of change of acceleration) are analyzed and each value is limited to a specific maximum value. By limiting these parameters, the mechanism is controlled in such a fashion that the visible oscillations are minimized. As well, any collected data below these limits is "sped up" to provide a faster inscription speed where the original collected data is below the operating limits of the mechanism.

In a particular implementation of the present invention, the optimizing utility (80) is a computer program implementing the optimization method described in this disclosure, and provided on the second computer (10). The second computer (10) is linked to the controller (74) and thereby to the plotting apparatus. Accordingly, the plotting apparatus is operable to process instructions from the controller (74) based on optimization provided by the optimization utility (80).

The optimization utility (80) is operable to analyze a human signature/dedication and construct a series of control commands configured to enable optimization of the operation of the plotting apparatus in relation to the particular human signature. These control commands are provided to the controller (74) and are used to control the respective extensions of the electric linear motors (70) (72) (78). The optimization utility (80) is operable to construct the control commands for movement of the pen device (69) in contact with an object placed on the target area (36), but based in part on optimization of such control commands for the aforementioned parameters. It should be understood that depending on the point in the target area (36) with which the pen device (69) is aligned in a particular moment in execution of the tracing of the signature/dedication, a control command will have a different meaning.

In a particular aspect of the present invention, the second computer (12) also receives additional data such as (but not limited) to data relating to the slope of the signature/dedication segments for inscription, which is analyzed for a further level of optimization. The slope data is useful because the plotting dynamics are different for radial movement than tangential movement. Specifically, tangential movement has large pen displacement per motor displacement than in the case of radial movement. Also, the mechanism is stiffer in the radial direction. Effectively, radial movement can be faster than tangential without artifacting. The optimization utility (80) is to consider these characteristics in optimizing the plotting of the particular signature.

The output of the optimization utility (80) is best understood as a "plotting file" that includes a series of control commands for movement of the pen (68) between a series of points in contact with the object placed in the target area (36), the control commands also defining limits on velocity, acceleration and jerk corresponding to each of the series of points. The electric linear motors (70) (72) (78) have inherent position feedback and therefore assuming the calibration explained above, in a particular embodiment of the present invention, the plotting apparatus (34) is operable to coordinate the positioning of the signature/dedication traced on the object with the signature/dedication made at the remote location. Accordingly, the control commands together constitute a control execution routine that enables the controller (74) to achieve a balance between speed and quality of reproduction for a particular human signature/dedication. The method, system and computer program of the present invention achieves significant improvements in speed and reduction of oscillation and therefore quality of reproduction.

The oscillation of the plotting apparatus (34) depends on mass. It is desirable therefore to reduce the mass of the moving components of the plotting apparatus (34). The motors are capable of exerting significant force levels and significant acceleration levels. However, the higher the mass, the lower the acceleration and speed that can be achieved. As well, the oscillations decrease with reduced mass, especially at the far end of the plotting apparatus (34) where the pen (68) is located. The machined metal components used to build the arms, pivots and pen assembly have been progressively reduced in mass while striving to maintain sufficient rigidity. Further reductions are possible that may result in some changes to the structure of the components of the preferred embodiment of the present invention as illustrated in the FIGS. 3-7d without departing from the scope of the present invention.

In accordance with a particular embodiment of the present invention, the plotting apparatus (34) is calibrated such that the X/Y coordinates of the bitpad of the tablet computer (32) are associated to correspond with the X/Y coordinates of the target area. In accordance with the Co-Pending Patent Application, an image of an object placed on the target area is shown at the remote location, and in conjunction with such image, a signature is made by the individual at the remote location. The calibration involves linking the placement of the digital pen at the remote location on an image of the object at the site of plotting apparatus to a specific point on the object itself, as explained above.

In another particular aspect of the present invention, the processing involved in optimization could begin once the user at the remote location has provided to the tablet computer (32) a minimum amount of useful information, thereby enabling optimization and commencement of operation of the plotting apparatus (34) possibly before the user and the remote location has finished writing. This results in reduction of waiting time.

The present invention also contemplates the development of specialized hardware for performing the optimization described, in which case the functions of the optimization routine and therefore the optimization utility (80) described would be realized to hardware, for example by providing such functions to a digital signal processing board in a manner that is known to those skilled in the relevant art.

In a particular aspect of the implementation of the present invention, an extension is established for each of the electric linear motors (70) (72) (78). The control commands included in the control routine and provided to the controller (74) incorporate such extensions. The controller (74) is thereby operable to process such control commands to selectively control the electric linear motors (70) (72) (78) based on the optimization defined for execution of the particular signature/dedication.

In another particular aspect of the present invention, it has been found that the electric linear motors (70) (72) (78) perform better if they are given additional information, namely the length of a particular segment of a signature/dedication to be traced and its angle. In one particular implementation of the present invention, a circuit board (not shown) is provided and placed on the body of the plotting apparatus adjacent to the pen. This circuit board is operable to collect information regarding the real time position of each of the electric linear motors (70) (72) (78) respectively.

It should be understood that the electric linear motors (70) (72) (78) include or are linked to lower level controllers (known motor controllers) (not shown) that are operable to control the functions of the motors themselves. Controller (74) is operable to act as a bridge between the second computer (10) (or any other computer linked to the plotting apparatus) that accepts and processes data for the plotting apparatus (34). The controller (74) is operable to coordinate: (a) data transfer to the lower level controllers and also (b) updating of the individual motor controllers. In a particular aspect of the implementation of the present invention, the controller (74) provides step & direction pulses that instruct them to "move in or out 1 step", for example. These pulses are generated by the integrated circuit that is part of the controller (74).

Figure 8:
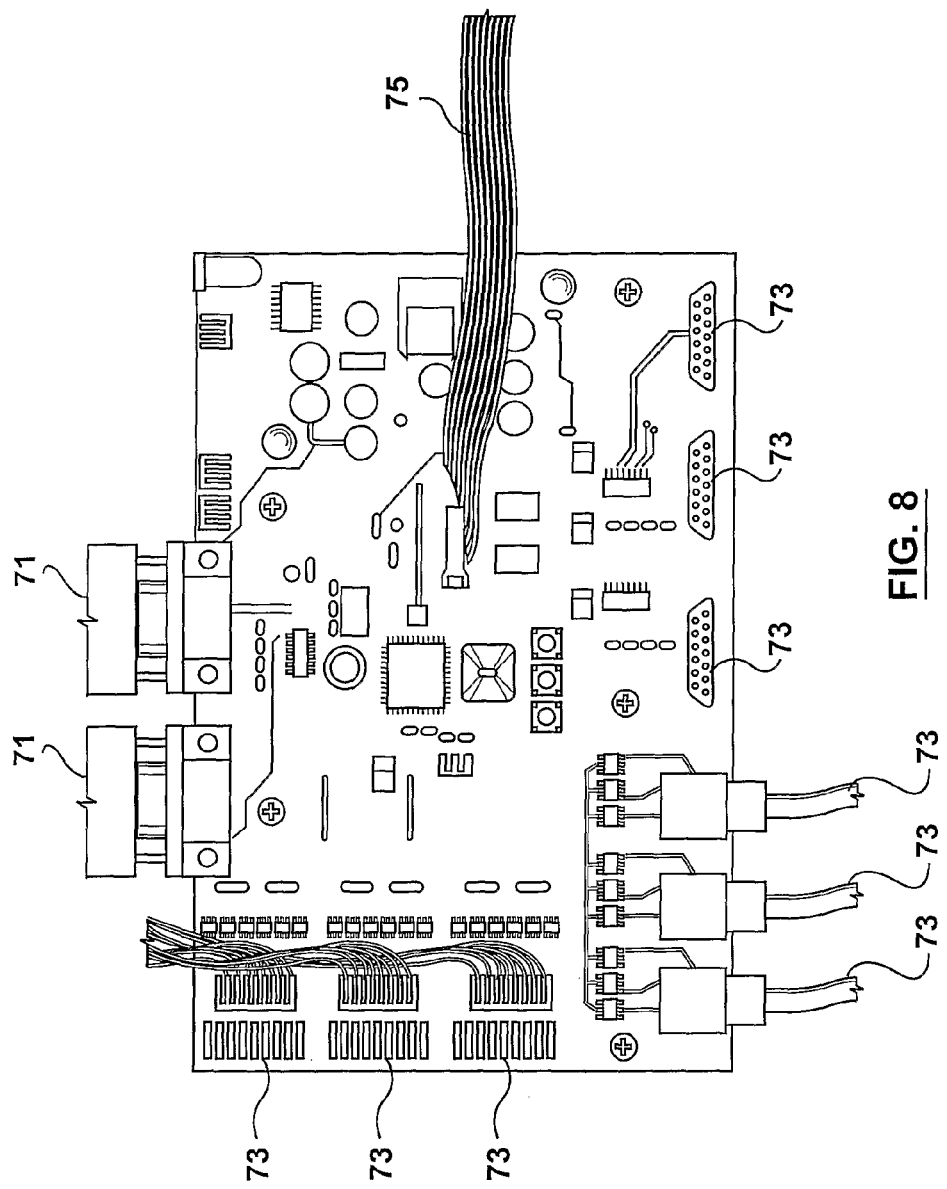
FIG. 8 is a representative view of a custom circuit board for providing the controller of the present invention.
Figure 9:
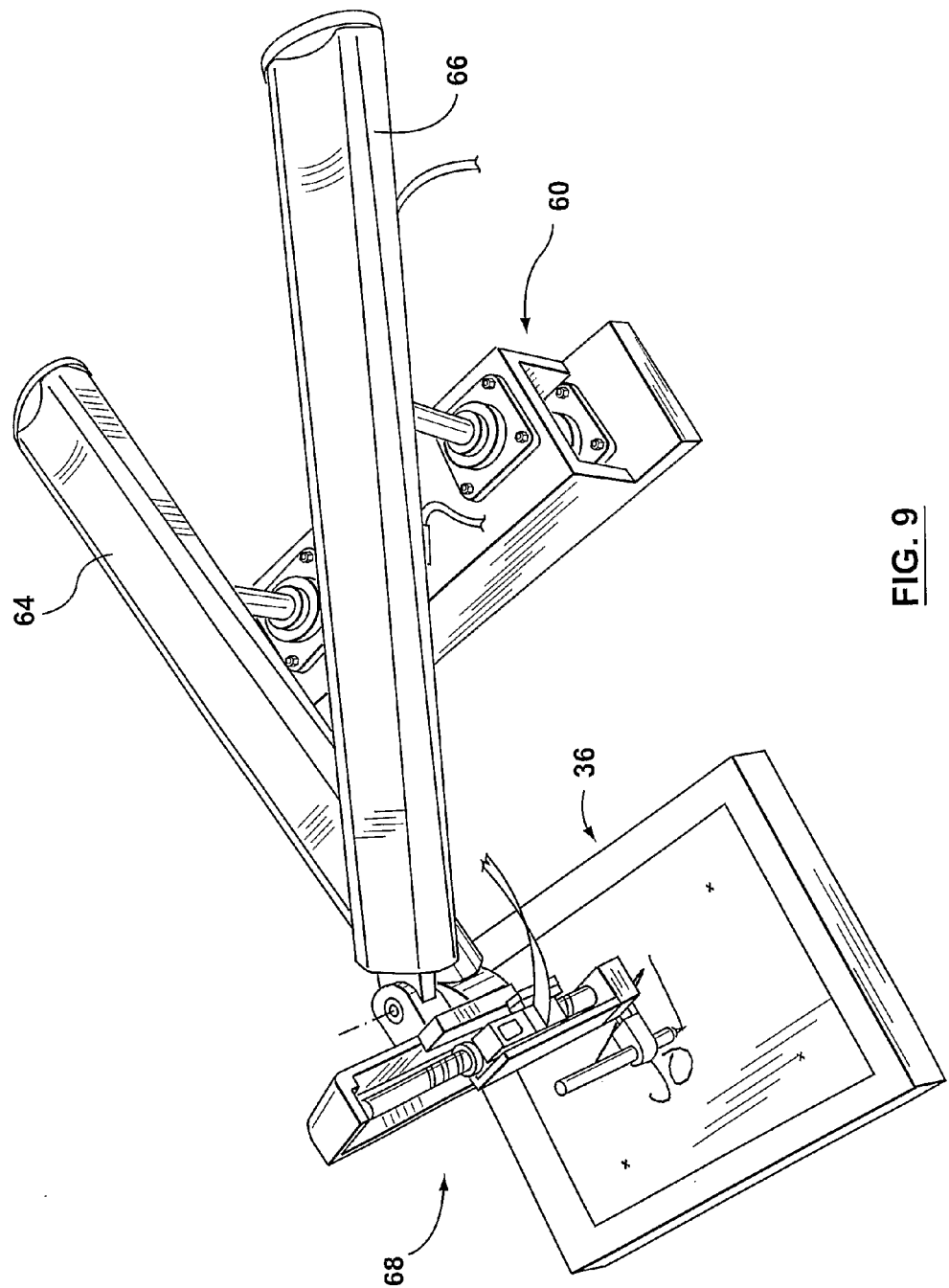
FIG. 9 is a top perspective view of the plotting apparatus of the present invention.

FIG. 8 illustrates the operation of the present invention. The diagram shows a representative word "JOHN" that is part of a human signature/dedication, traced in accordance with the present invention. The arrows in the Figure show the stroke direction of pen device (69) on the object in the target area (36). The four letters of "JOHN" in this case were each written in one continuous stroke. The pen (68) began at the bottom of the page, so in this example of operation the first and second arms (64) (66) extended up to the signature. As explained above, tangential motion is when the first and second arms (64) (66) are mostly pivoting and radial motion is when the first and second arms (64) (66) arms are mostly extending or contracting. Given the applicable stroke of the plotting apparatus, the device is operable to make tangential motions much faster than radial motions if the rods are moved at the same rate.

The below illustrates operation of the plotting apparatus of the present invention, based on commands devised by operation of the optimization utility (80), in relation to the particular example of tracing of "JOHN" as per FIG. 8:

(A) At point 1 illustrated in FIG. 8, the pen (68) path makes a drastic change in direction (tangential (a) to tangential (b)). As motion in the tangential direction has a large mechanical advantage, the pen (68) preferably slows down prior to the reversal in direction, to avoid overshoot, and accelerate slowly as it leaves point 1.

(B) At point 2 illustrated in FIG. 8, the pen (68) changes from primarily tangential motion to radial motion. Again the pen must slow down to avoid overshoot but can accelerate more quickly as it leaves point 2.

(C) At point 6 illustrated in FIG. 8, the change in direction is radial to radial. In this case the pen (68) does not need to slow down on approach and can accelerate quickly as it exits point 6.

(D) At point 3 illustrated in FIG. 8, the bottom of the "J" can again be considered, to be a radial to radial transition but through the transition there is a significant tangential component. Therefore the pen is slowed down slightly as it traces the curve.

(E) During the "O" (points 4 & 5 illustrated in FIG. 8) the same problem exists. As in the case of point 3, the pen (68) is preferably slowed while tracing the bottom of the 'O'. It should be noted that the top of the 'O' does not have this problem as the pen (68) is lifted and therefore overshoot can be ignored.

(F) The 'pen up' transition from the "J" to the "O" must be slowed down at the end to stabilize the pen (68) before it is lowered to the paper but this is not the case for the to 'H' to 'N' transition as its motion predominantly radial.

Other variations and modifications of the invention are possible. For example, an authentication utility can be integrated into the system of the present invention. The authentication utility can rely on a key infrastructure such as the Public Key Infrastructure or PKI. The authentication utility can be used to create an audit trail of "genuine" signatures/dedications that have been created based on operation of the system. Another aspect of the authentication utility, is that an identifier of some type that is not readily reproduced using a photocopier can be inserted into the scribble file provided to the plotting apparatus, and thereby inserted into the signature/dedication, thereby identifying same as being "authorized". All such modifications or variations are believed to be within the sphere and scope of the invention as defined by the claims appended hereto.

We claim:

1. A method of enabling signings and/or dedications on a remote basis, the method comprising:
    establishing a two-way audiovisual communication between a first electronic device at a first location and a second electronic device at a second location remote from the first location;
    transmitting, from the second electronic device, signals representing a request for a signature and/or dedication by an individual at the first location;
    receiving, at the second electronic device, signals representing a signature and/or personalized dedication handwritten by the individual at the first location;
    plotting, with a plotting device at the second location, the signature and/or personalized dedication based on the signals representing the signature and/or personalized dedication; and
    analyzing signals representing the signature and/or personalized dedication and defining a plurality of commands defining an optimal tracing path and associated attributes, said plurality of commands being operable on the plotting device to achieve a balance between speed of operation and quality of reproduction.

2. The method of claim 1, wherein the plotter device is designed to receive at least one of: a paper product, and at least a portion of an article of clothing.

3. The method of claim 1, comprising:
    capturing an image of an article at the second location; and
    transmitting the image from the second electronic device for displaying to the individual at the first location in a manner that assists the individual in providing the signature and/or personalized dedication for a target area of the article.

4. The method of claim 1, comprising:
    capturing an image of the plotted signature and/or personalized dedication on a target article at the second location; and
    transmitting the image to the first electronic device for verification, at the first location, of the plotted signature and/or personalized dedication.

5. A method of enabling signings and/or dedications on a remote basis, the method comprising:

establishing a two-way audiovisual communication between a first electronic device at a first location and a second electronic device at a second location remote from the first location;

receiving at the first electronic device, signals representing a request for a signature and/or dedication by an individual at the first location;

receiving, at the first electronic device, input representing a signature and/or personalized dedication by the individual at the first location;

transmitting signals representing the signature and/or personalized dedication to the second electronic device for plotting by a plotting device at the second location; and analyzing the signals representing the signature and/or personalized dedication and defining a plurality of commands defining an optimal tracing path and associated attributes, said plurality of commands being operable on the plotting device to achieve a balance between speed of operation and quality of reproduction.

6. The method of claim 5, wherein the plotter device is designed to receive at least one of: a paper product, and at least a portion of an article of clothing.

7. The method of claim 5, comprising:
receiving, at the first electronic device, an image of an article at the second location; and
displaying the image at the first location for assisting the individual in providing the signature and/or personalized dedication for a target area of the article.

8. The method of claim 5, comprising:
receiving, at the first electronic device, an image of the plotted signature and/or personalized dedication on a target article; and
storing or displaying the image at the first location for verifying the plotted signature and/or personalized dedication.

9. A first electronic device for enabling signings and/or dedications on a remote basis, the device comprising:
a communication interface for communicating with a second electronic device at a remote location; and
a processor configured for:
establishing a two-way audiovisual communication with the second electronic device;
transmitting signals representing a request for a signature and/or dedication by an individual at the remote location;
receiving signals representing a signature and/or personalized dedication handwritten by the individual at the remote location;
plotting, with a plotting device comprising or connected to the first electronic device, the signature and/or personalized dedication based on the signals representing the signature and/or personalized dedication; and
analyzing the signals representing the signature and/or personalized dedication and generating a plurality of commands defining an optimal tracing path and associated attributes, said plurality of commands being operable on the plotting device to achieve a balance between speed of operation and quality of reproduction.

10. The electronic device of claim 9, wherein the plotter device is designed to receive at least one of: a paper product, and at least a portion of an article of clothing.

11. The electronic device of claim 9, wherein the processor is configured for:
capturing an image of an article; and
transmitting the image for assisting the individual at the remote location in providing the signature and/or personalized dedication for a target area of the article.

12. The electronic device of claim 9, wherein the processor is configured for:
capturing an image of the plotted signature and/or personalized dedication on a target article; and
transmitting the image to the second electronic device for verification, at the remote location, of the plotted signature and/or personalized dedication.

* * * * *